Oct. 3 1967   R. H. McLAREN   3,345,636
RAILROAD LOCOMOTIVE VELOCITY ALARM
Filed May 7, 1964

INVENTOR.
RICHARD H. MC LAREN
BY
ATTORNEYS United States Patent Office 3,345,636

Patented Oct. 3, 1967

1

3,345,636
RAILROAD LOCOMOTIVE VELOCITY ALARM

Richard H. McLaren, 502 S. Idaho St., Dillon, Mont. 59725

Filed May 7, 1964, Ser. No. 365,842
2 Claims. (Cl. 346—18)

This invention relates to automatic record making mechanisms, and more particularly to velocity alarm devices operable by recording speedometers, as used in railroad locomotives. Recording speedometers as heretofore proposed record when the locomotive moved, how far it moved, the speeds at which it moved, and when it stopped.

It is the object of the present invention to provide a simple device which in one of its adaptations is operable in conjunction with the mechanism of a recording speedometer of the above described character, to signal excessive speed for particular railway track conditions through a predetermined guide or pattern, all to the end of reducing operating costs and promoting safety.

Another object of the present invention is to provide an accurate and novel device of this character employing an energized conductive line or strip on a prepared alarm tape to sense deviations from a predetermined safe speed.

A further object of this invention is to provide a device of this character utilizing an energized recording stylus of the speedometer which when in contact with the energized strip of the alarm tape will actuate an alarm bell.

Still a further object of my invention is to provide an alarm system which utilizes a presently unused conductive strip affixed to the conventional recording railroad speedometer tape, as at present manufactured, thus facilitating the speedometers now in use through minimal modification thereof to the end that the maximum advantage of the mechanism may be had at a minimum increase in the cost of the instrument.

My invention resides in the combinations, arrangements, and functional relationships of elements as set forth in the following specifications and particularly pointed out in the appended claims.

Other objects and advantages of the invention will be apparent from a reading of the following description in connection with the accompanying drawings.

Figure 1:
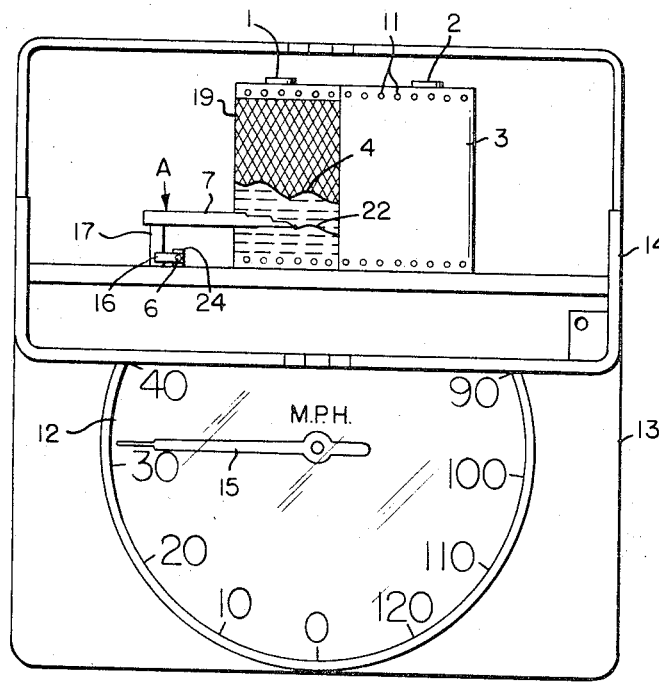
FIGURE 1 is an open front elevation of an automatic recording mechanism embodying my invention in a well known model of a locomotive recording speedometer now in use.
Figure 4:
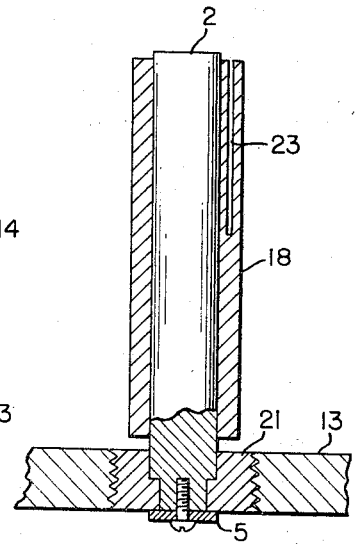
FIGURE 4 is an enlarged longitudinal sectional view of the conductive core, spindle, and insulated base taken on line A—A of FIG. 3.

Referring specifically to the drawing this invention comprises one form of tape marking device A, a prepared alarm tape B, and an electrical circuit C to control the operation of alarm bells in accordance with variations of the speed recording stylus.

For purposes of illustration the tape marking device A, is shown as incorporated in a recording speedometer manufactured as "Chicago Pneumatic Speed Recorder," which will now be briefly described.

This speedometer has a rectangular case body 13 and a hinged lid 14 closing the open top of the body and capable of being locked in closed position.

2

The tape 3 is removably mounted for travel between spindles 1 and 2, FIG. 1, and records speed from 10 to 120 miles per hour through contact with the point of the vertically reciprocable stylus 7, which inscribes on the pressure sensitive surface of the tape a continuous line 22, the purpose of which will be clearly understood by those familiar with the art.

Figure 3:
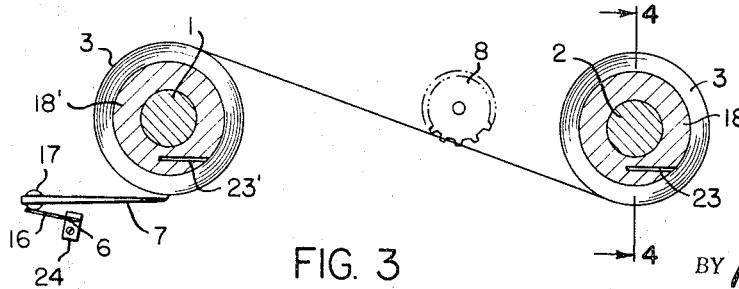
FIGURE 3 is a schematic enlarged top view of the prepared alarm tape disposed in operative position in this mechanism.

The stylus 7 is operated by a conventional speedometer mechanism comprising a dial 12 graduated in miles per hour to co-act with a pointer 15. The speedometer includes a distance meter as evidenced by the perforations 11 on the border of the recording tape 3. A sprocket wheel 8, which may be connected in a conventional manner to the driven take-up spindle 1, helps to advance said tape (FIGURE 3) from spindle 2 to spindle 1 at the rate of one perforation 11 per mile of travel.

The line record 22 thus produced by the vertical fluctuations of the stylus 7 on the horizontally moving tape 3 indicates speed and distance traveled.

My invention is operable in conjunction with the stylus 7 and is operatively associated with the alarm tape 3 to utilize the correlation of speed-location.

The electrification of the metal recording stylus 7 is accomplished by affixing a 1.5 volt negative terminal 6 at the fixed end of a conductive spring 16 which maintains contact at its free end with the metallic stylus support post 17. Electrification of the alarm tape is accomplished by affixing a 1.5 volt positive terminal 5 to spindle 2 which is electrically connected to the conductive portion of the alarm tape 3 as below described. The energizing current for both terminals 5 and 6 is provided via suitable conduits from the electrical supply 10.

The alarm tape 3, as now used in such recording speedometers, manufactured by Chicago Pneumatic Tool Co., is prepared to conform to the present invention by coating or superimposing upon the face thereof in India ink or other electrically conductive ink, a conductive inlay or strip 19 having a lower edge 4 (FIGS. 1 and 2) which defines a maximum locomotive velocity curve. Only that portion 19 of the alarm tape signifying dangerous velocity is drawn in conductive ink. The conductive portion 19 of the tape is energized by extending approximately one-fourth inch of the inner end of the alarm tape 3 through a slot 23 in a metal core or supply sleeve 18, which is rotatable on spindle 2, thereby placing the energized spindle 2 and the conductive portion 19 in electrical contact when the alarm tape and core 18 are placed upon the spindle 2.

A like core 18' having therein a slot 23' for retaining the opposite end of tape 3 may be removably secured to the spindle 1 for winding the tape 3 thereon during the travel of the locomotive. In such case spindle 1 is electrically non-conductive, or is insulated in a conventional manner from body 13.

The spindle 2 which supports core 18 may be formed of any suitable conductive material. The spindle 2 is fixed in a non-conductive plate 21 to the speedometer case body 13.

Figure 2:
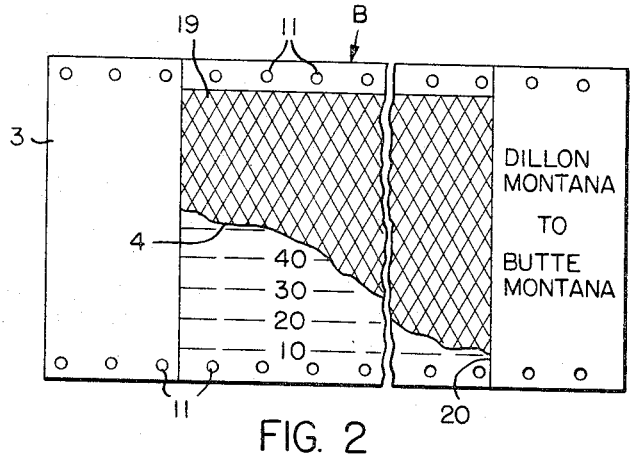
FIGURE 2 is an enlarged front view of the prepared alarm tape used with this mechanism.
Figure 5:
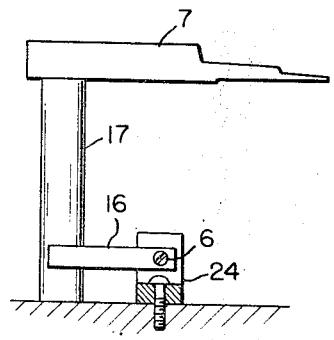
FIGURE 5 is an enlarged front view of the stylus energizing sprring.
Figure 6:
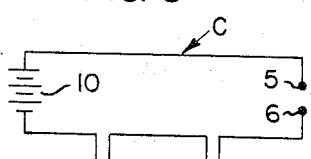
FIGURE 6 is a schematic wiring diagram showing the electrical connections involved in the device.

As shown in FIGURE 6 the electrical circuit C contains magnetic type bells 28 and 29 which sound when the circuit is closed. Closing of said circuit C occurs when the speed of the locomotive causes the energized stylus 7 to shift vertically upwardly far enough to contact the energized portion 19 of the alarm tape 3 at any point along or above the curve 4 as shown in FIGS. 1 and 2.

The maximum velocity curve 4 is plotted on the alarm tape 3 in conformation with predetermined safe operating speeds for each particular section of railroad track. Such speeds are available from section speed limit tables on file. One may thus plot curve 4 from such tables using the horizontal axis of the tape 3 as location, 0.5 inch per mile, and the vertical axis of the tape 3 as maximum speed, 0.20 inch per 10 m.p.h. As each railroad trip conforms to a similar location-speed pattern, the master curve 4 will be specific for that particular journey. Such a pattern is revealed by the undulations in the curve 4 as seen on the face of the alarm tape 3 in FIGURE 2. Plotting of curve 4 is accomplished by interpolation of the speed values in reference to location, as shown in the following table representing a typical short section of railroad track:

*Westbound*

| Location (mile post): | Speed limit (m.p.h.) |
|---|---|
| Dillon | Station |
| 328.63 | 35 |
| 329.08 | 35 |
| 329.49 | 60 |
| 336.48 | 60 |
| 337.02 | 40 |

All areas 19 of the alarm tape above curve 4 will be made conductive in nature (in accordance with the present invention), as clearly shown in FIGURE 2.

In operating the device, the alarm tape 3 is inserted via its core 18 upon spindle 2. The free end of the tape is then threaded and affixed to the take-up core 1.

The alarm tape 3 must be adjusted on insertion so that the trip origin 20 of the maximum velocity curve 4 corresponds with 0 miles traveled, namely the stylus 7 rest point at trip beginning. The origin 20 of curve 4 being so located upon the alarm tape 3 at manufacture that said origin corresponds with 0 miles traveled. The alarm tape 3, in motion, advances 0.5 inch for every mile of locomotive travel and in conjunction with the speed recording stylus will register the speeds attained during 1000 miles of travel. An appropriate alarm tape will be installed at convenient track terminals. Each alarm tape 3 is specific for each particular section of track, and is so designated by the identification label thereon (represented in FIGURE 2 as Dillon, Mont. to Butte, Mont.). To illustrate the device of this invention, let it be assumed that alarm tape 3 is recording a locomotive speed of 50 miles per hour at milepost 336.48. The maximum safe velocity curve 4 on alarm tape 3 at this instant, directly above recording stylus 7 parallels the 60 mile per hour line on the alarm tape 3. By reason of an approaching curve in the track at mile post 338 the curve 4 depresses to the 40 mile per hour level on tape 3 at mile post 337.02. If locomotive velocity is not reduced sufficiently to cause a concommittant depression of stylus 7 to below the 40 mile per hour level on the alarm tape 3 when the location 337.02 is reached by said locomotive, there will occur a physical contact of stylus 7 and curve 4 and current will flow in circuit C as said stylus 7 and curve 4 are energized components of an electrical series. This current will immediately cause the alarm bells 28 and 29 to sound as they are incorporated in circuit C. The bells 28 and 29 will sound if excessive speed is maintained, regardless of said speeds magnitude, as long as the recording stylus 7 is impinging on the conductive portion 19 of the alarm tape 3. Only by decreasing locomotive speed with a concurrent depression of the recording stylus will the alarm cease to sound, except in the case wherein the velocity curve 4 ascends on the the tape and the resulting acceptable speed limit so defined exceeds the rate of ascension made by the recording stylus 7. By review of the line recorded 22 as speed in miles per hour scribed by the stylus 7, one can accurately determine the locomotives location when excessive speed commenced and the location when excessive speed ceased, by noting intersections of line 22 with the maximum safe velocity curve 4.

The novelty of this alarm system resides in the correlation of velocity and location factors, which yield in turn a pre-determined fluctuating maximum safe locomotive speed dependent on track conditions.

While the preferred embodiment of the device has been described and illustrated herein, it will be understood that changes may be made in the construction within the scope of the appended claims without departing from the spirit of the invention.

Having described the invention, what is claimed as new and desired to be protected by Letters Patent of the United States is:

1. A velocity alarm device for a railroad locomotive, comprising
    (a) a flexible tape mounted to move in one direction at a rate proportional to the velocity of the locomotive,
    (b) a portion of the surface of said tape on one side thereof being electrically conductive, and the remaining portion of said surface being electrically non-conductive, and said conductive portion having an undulating edge separating said portions and extending in said one direction and indicative of the safe maximum velocity of the locomotive at any given instant,
    (c) an electrically conductive marking element normally engaging said non-conductive portion of said surface, when said locomotive is travelling at a safe velocity, and reciprocable across said surface transverse to said one direction toward and away from said edge in response to increases and decreases, respectively, in the velocity of said locomotive to inscribe on said one side of said tape a line indicative of the velocity of the locomotive at any given instant, and to move into engagement with said electrically conductive portion, when the locomotive exceeds said safe maximum velocity,
    (d) an electrical alarm, and
    (e) means connecting said element, said electrically conductive portion of said surface and said alarm in circuit with a power supply, and operative to energize said alarm, when said element is engaged with said electrically conductive portion, and to deenergize said alarm, when said element is engaged with said non-conductive portion,
    (f) said undulating edge being based upon predetermined maximum velocities at which said locomotive may safely operate at given points along its travel from one destination to another,
    (g) said circuit including a pair of stationary contacts, and
    (h) said means including
        (1) means electrically connecting said marking element to one of said contacts for movement relative thereto, and
        (2) means electrically connecting said electrically conductive portion of said surface to the other of said contacts for movement relative thereto during the travel of said tape in said one direction.

2. A velocity alarm device for a railroad locomotive, comprising
    (a) a tape mounted to move in one direction at a rate proportional to the velocity of the locomotive,
    (b) a portion of the surface of said tape on one side thereof being electrically conductive, and the remaining portion of said surface being electrically non-conductive, and said conductive portion having an undulating edge extending in said one direction and indicative of the safe maximum velocity of the locomotive at any given instant,
    (c) an electrically conductive marking element normally engaging said non-conductive portion of said surface and reciprocable across said surface transverse to said one direction toward and away from said edge in response to increases and decreases, respectively, in the velocity of said locomotive to inscribe on said one side of said tape a line indicative of the velocity of the locomotive at any given instant,
    (d) an electrical alarm, and (e) means connecting said element, said electrically conductive portion of said surface and said alarm in circuit with a power supply, and operative to energize said alarm, when said element is engaged with said electrically conductive portion, and to deenergize said alarm, when said element is engaged with said non-conductive portion,
(f) said tape moving between a pair of spaced, parallel spindles, one of which is driven about its axis at a rate proportional to the velocity of said train, and the other of which is electrically conductive,
(g) an electrically conductive sleeve being rotatably mounted on said other spindle and being in electrical contact therewith, and
(h) said tape being wound about said sleeve and having the inner end thereof seated in a slot in said sleeve electrically to connect said conductive portion of said tape surface to said sleeve.

References Cited

UNITED STATES PATENTS 2,718,448   9/1955   Powers _____ 346—18

NEIL C. READ, *Primary Examiner.*

A. H. WARING, *Assistant Examiner.*